US010578045B1

(12) United States Patent
Cancellieri et al.

(10) Patent No.: US 10,578,045 B1
(45) Date of Patent: Mar. 3, 2020

(54) SYSTEM AND METHOD FOR ENHANCING ROBUSTNESS OF ENGINE COMPONENT DIAGNOSTIC USING COMPENSATION LEARNING STRATEGY

(71) Applicant: GM Global Technology Operations LLC, Detroit, MI (US)

(72) Inventors: Angelo Cancellieri, Turin (IT); Paul Leonardo Claude, Turin (IT); Francesco Siano, Givoletto (IT); Pietro Orlando, Turin (IT); Fabio Sessa, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 16/110,404

(22) Filed: Aug. 23, 2018

(51) Int. Cl.
*F02D 41/00* (2006.01)
*F02D 41/24* (2006.01)
*F02D 41/30* (2006.01)

(52) U.S. Cl.
CPC ..... *F02D 41/2477* (2013.01); *F02D 41/2451* (2013.01); *F02D 41/3005* (2013.01); *F02D 2200/0614* (2013.01)

(58) Field of Classification Search
CPC ............... F02D 41/2477; F02D 41/248; F02D 41/2483; F02D 41/3011; F02D 41/3017; F02D 41/2451; F02D 41/2461; F02D 2200/0614
See application file for complete search history.

(56) References Cited

U.S. PATENT DOCUMENTS

| | | | | |
|---|---|---|---|---|
| 9,651,535 | B2* | 5/2017 | Christensen | F02D 41/3845 |
| 2011/0125389 | A1* | 5/2011 | De Fazio | F02D 41/123 701/103 |
| 2014/0102186 | A1* | 4/2014 | Leblon | F02D 35/023 73/114.48 |
| 2015/0096539 | A1* | 4/2015 | Leblon | F02D 41/2096 123/478 |
| 2015/0345409 | A1* | 12/2015 | Bollinger | F02D 41/2438 701/105 |

* cited by examiner

*Primary Examiner* — Thomas N Moulis
(74) *Attorney, Agent, or Firm* — Quinn IP Law

(57) ABSTRACT

A method using compensation learning strategy for a diagnostic of an internal combustion engine component includes operating the component via an actuator command to establish a first operating parameter representative of a first mode of component operation. The method also includes identifying a drift in the first parameter negatively affecting the first mode of operation. The method additionally includes determining compensation to the actuator command to counteract the first parameter drift during the first mode of operation. The method also includes determining compensation to the first parameter using the determined actuator command compensation. The method additionally includes applying the determined parameter compensation directly to the first parameter. The method also includes operating the component using the actuator command to establish a second operating parameter representative of a second mode of component operation. Furthermore, the method includes identifying a drift in the second parameter negatively affecting the second mode of operation.

20 Claims, 3 Drawing Sheets

SYSTEM AND METHOD FOR ENHANCING ROBUSTNESS OF ENGINE COMPONENT DIAGNOSTIC USING COMPENSATION LEARNING STRATEGY

INTRODUCTION

The present disclosure relates to a system and a method for enhancing robustness of an internal combustion engine component diagnostic using compensation learning strategy.

Modern internal combustion engines typically employ control systems to monitor and regulate engine performance by implementing diagnostic algorithms for various engine components, such as sensors and actuators. Such learning strategies are frequently used to compensate for performance deviations due to part-to-part variation and component aging compared to nominal component behavior.

Typically, such strategies include a learning phase in which the component deviation is measured and stored, and a release phase in which a learning compensation is applied to a control signal or command. In some instances and for certain components, a learning function may be used to perform a diagnostic observation of a second component parameter that is physically linked to a first component parameter already subject to learning compensation.

Such use of the learning function for a particular component may result in an influence of the learning compensation of the first component parameter on the diagnostic observation of the second component parameter. However, a removal of the learning compensation of the first component parameter during the diagnostic observation of the second parameter crates an intrusive test that may lead to certain performance targets for the subject component not being met.

SUMMARY

A method using compensation learning strategy for a diagnostic of an internal combustion engine component includes operating the engine component via an actuator command issued by an electronic controller. Specifically, the actuator command is used to establish a first operating parameter representative of a first mode of component operation. The method also includes identifying, via the electronic controller, a drift in the first operating parameter negatively affecting the first mode of operation. The method additionally includes determining, via the electronic controller, a command compensation to the actuator command to counteract the drift in the first operating parameter during the first mode of operation. The method also includes determining, via the electronic controller, a parameter compensation to the first operating parameter using the determined compensation to the actuator command. The method additionally includes applying the determined parameter compensation directly to the first operating parameter. The method also includes operating the engine component using the actuator command to establish a second operating parameter representative of a second mode of component operation. Furthermore, the method includes identifying, via the electronic controller, a drift in the second operating parameter negatively affecting the second mode of operation while applying the determined parameter compensation directly to the first operating parameter and without applying the determined command compensation to the actuator command.

Determining the parameter compensation may include translating the command compensation into a delta reference compensation value to apply directly to the first operating parameter while identifying the drift in the second operating parameter.

Translating the command compensation into the delta reference compensation value may include using a mathematical relationship programmed into the controller.

Translating the command compensation into the delta reference compensation value may include accessing an empirically collected look-up table of values of determined compensation to the actuator command versus delta reference compensation values.

The engine may be a compression ignition engine and the component may be an injector configured to inject fuel into the engine.

The first operating parameter may be a relatively small injection quantity and the first mode of operation is pilot fuel injection.

The second operating parameter may be a relatively large injection quantity and the second mode of operation is main combustion fuel injection.

Identifying the drift in the second operating parameter while applying the determined parameter compensation directly to the first operating parameter and without applying the determined command compensation to the actuator command may include maintaining pre-combustion temperature in the combustion chamber and maintaining combustion stability in the engine.

Alternatively, the second operating parameter may be a relatively small injection quantity and the second mode of operation may be post-combustion fuel injection.

The engine may include an exhaust after-treatment (AT) device configured to reduce engine exhaust gas emissions. In such a case, identifying the drift in the second operating parameter while applying the determined parameter compensation directly to the first operating parameter and without applying the determined command compensation to the actuator command may include at least one of maintaining effective operation of the AT device and maintaining reduction of engine exhaust gas emissions thereby.

A system using compensation learning strategy for a diagnostic of an internal combustion engine component, such as via an electronic controller performing the above-described method, is also disclosed. A vehicle may employ such a system.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
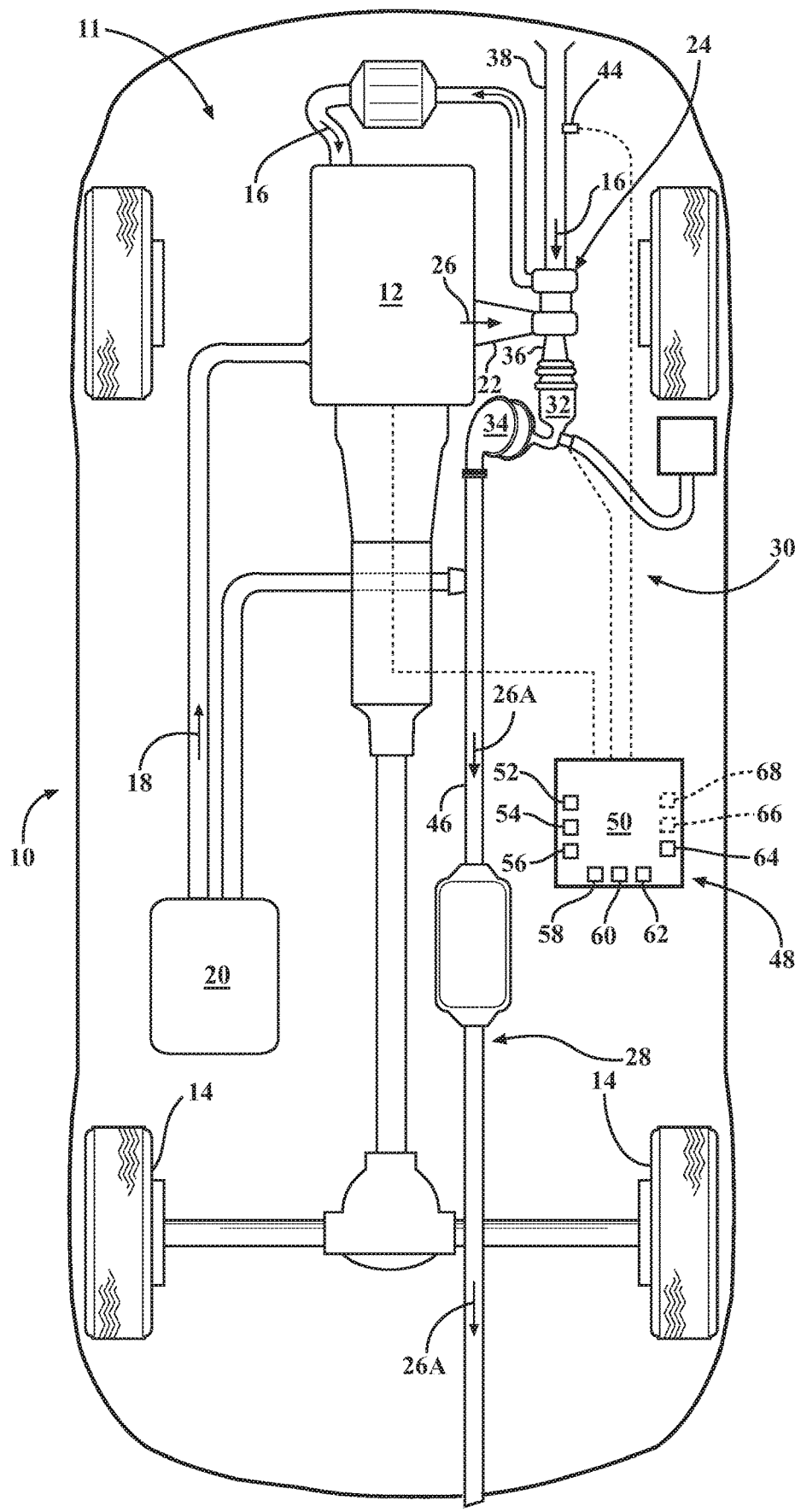
FIG. 1 is a schematic plan view of a vehicle having an internal combustion engine connected to an exhaust system having an after-treatment (AT) system with a number of AT devices for reducing exhaust emissions and including a system using an electronic controller to perform compensation learning strategy for a diagnostic of an engine component.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a compression-ignition or diesel type of an engine. Generally, internal combustion in a diesel engine 12 occurs when a specific amount of ambient intake airflow 16 is mixed with a metered amount of fuel 18 supplied from a fuel tank 20 and the resultant air-fuel mixture is compressed inside combustion chamber 13A of the engine's cylinders 13 (shown in FIG. 2).

As shown, the engine 12 may include an exhaust manifold 22 configured to collect exhaust gas from the engine's cylinders 13. The engine also includes a turbocharger 24 in fluid communication with cylinders 13, such as via the exhaust manifold 22. The turbocharger 24 is energized or driven by a flow of exhaust gas, specifically the exhaust gas 26 released by individual cylinders 13 of the engine 12, such as through the exhaust manifold 22, following each combustion event. The turbocharger 24 is connected to an exhaust system 28 that receives exhaust gas 26 and eventually releases the exhaust gas to the ambient, typically on a side or aft of the vehicle 10. The turbocharger 24 also uses the exhaust gas 26 flow to pressurize the intake airflow 16.

Figure 2:
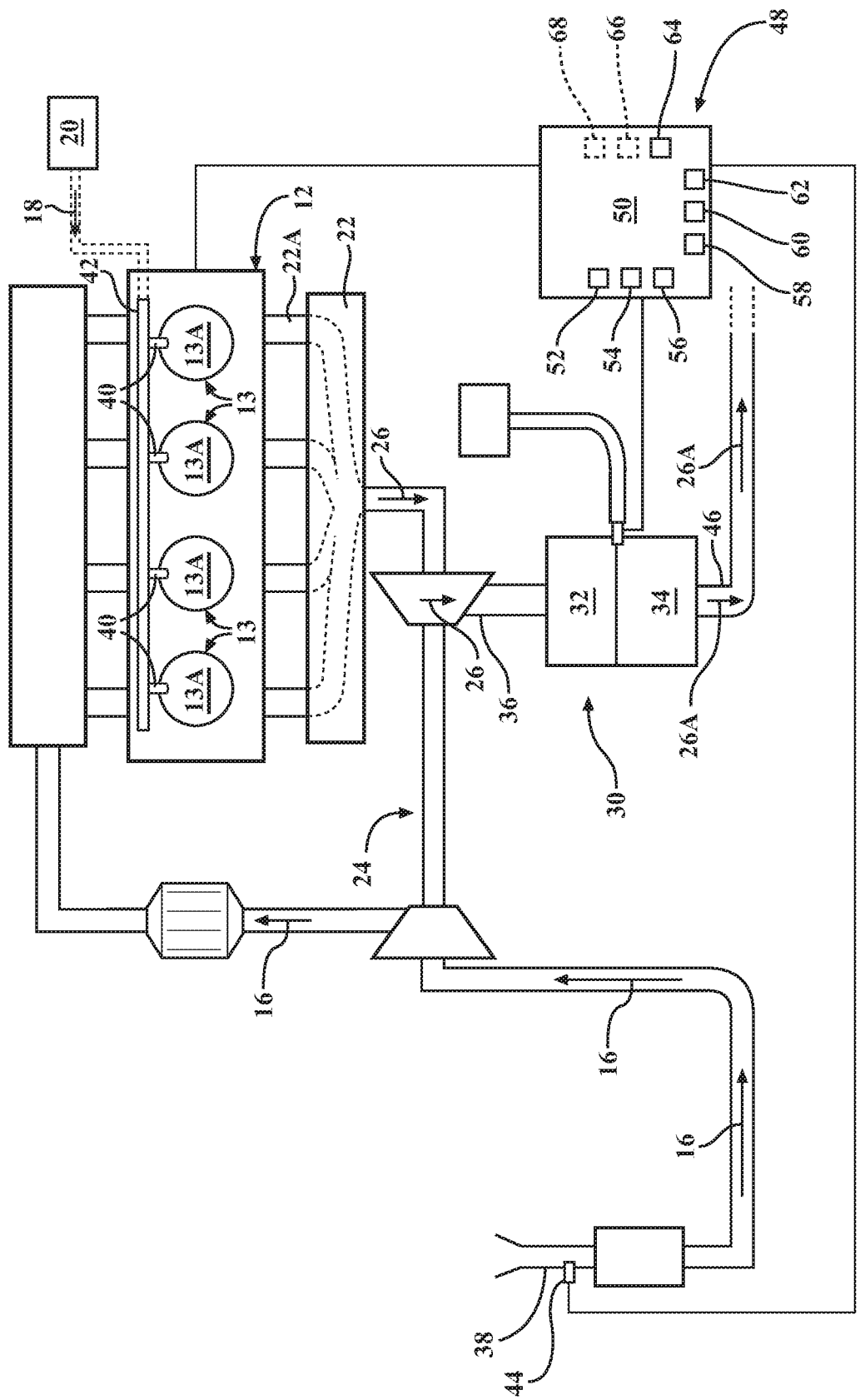
FIG. 2 is a close-up schematic illustration of an engine cylinder having a combustion chamber and a representative engine component in the internal combustion engine shown in FIG. 1.

The vehicle 10 also includes an engine exhaust after-treatment (AT) system 30. The AT system 30 includes a number of exhaust after-treatment devices configured to methodically remove largely carbonaceous particulate byproducts and emission constituents of engine combustion from the exhaust gas 26. As shown in FIGS. 1 and 2, the AT system 30 operates as part of the exhaust system 28. The AT system 30 includes at least one AT device, such as a first AT device 32 arranged downstream of the turbocharger 24 and a second AT device 34 arranged downstream of the first AT device. The first AT device 32 may be close-coupled to the turbocharger 24 and arranged inside an engine compartment 11 of the vehicle 10 for close proximity to the engine 12. Such close-coupling of the first AT device 32 to the engine 12 may provide a compact packaging arrangement that minimizes time for activation, i.e., light-off, of the AT system 30 in after-treatment of the exhaust gas 26 following a cold-start of the engine 12. The AT system 30 may also include additional AT devices (not shown) positioned in the exhaust gas flow downstream of the first and second AT devices 32, 34.

As shown, the first AT device 32 may be a diesel oxidation catalyst (DOC), while the second AT device 34 may be a selective catalytic reduction (SCR) catalyst and filter. The primary function of the DOC is reduction of carbon monoxides (CO) and non-methane hydrocarbons (NMHC). When present, the DOC is additionally configured to generate nitrogen dioxide ($NO_2$), which may be used by the SCR arranged remotely downstream of the DOC. The primary function of the SCR is to reduce a concentration of nitrogen oxides ($NO_x$) in the exhaust gas 26.

The AT system 30 also includes the exhaust passage 22A, which may be part of the exhaust manifold 22, configured to carry the flow of exhaust gas 26 to the turbocharger 24 from the engine's cylinders 13, and an exhaust passage 36 configured to carry the flow of exhaust gas 26 aft of the turbocharger 24 to the first AT device 32. The intake airflow 16 is supplied to the engine 12 via an intake passage 38 for mixing with the fuel 18, to generate combustion, thereby operate the engine, and generate a flow of the exhaust gas 26. The engine 12 may include an engine component 40 used to operate the engine component using an actuator command via a control signal issued by an electronic controller to be described in detail below.

The engine component 40 may be a component employing a learning strategy diagnosing a calibrated zero point and span of control that would benefit from self-calibration without shut-off. Specifically, the engine component 40 may be a fuel injector supplied with the fuel 18 via an injector rail 42 and employed to inject the fuel 18 into the engine's cylinders 13. Although the engine 12 may include other examples of the engine component 40, such as sensors and actuators, the remainder of the present disclosure will concentrate on the fuel injector embodiment of the subject component. Accordingly, from hereon, the fuel injector will be labeled with the numeral 40. The internal combustion engine 12 may generally have a multi-cylinder configuration employing at least one such fuel injector 40 per each cylinder 13.

An airflow sensor 44 may be arranged in the intake passage 38 and configured to detect an amount of the airflow 16 supplied to the engine 12 during its operation and such data may be used for controlling the amount of fuel 18 injected into the cylinders 13. An exhaust gas passage 46 is configured to receive treated exhaust gas 26A aft of the second AT device 34 and pass the treated exhaust gas through the rest of the exhaust system 28 and the remainder of the AT system 30.

The vehicle 12 also includes a system 48 configured to perform a diagnostic of the component 40 using compensation learning strategy that will be described in detail below. The system 48 is further configured to reduce an influence of the learning compensation of one component 40 operating parameter on the diagnostic observation of another component 40 operating parameter, without detrimentally impacting performance of the subject component. The vehicle 10 additionally includes an electronic controller 50 configured to regulate the AT system 30, and, as such, the controller may be part of the AT system. The controller 50 is part of the system 48 and may be a stand-alone unit, or be part of an electronic control unit (ECU) that regulates the operation of engine 12. The controller 50 is arranged on the vehicle 10 and includes a processor and a readily accessible non-transitory memory. Instructions for controlling operation of the AT system 30 are programmed or recorded in the memory of the controller 50, and the processor is configured to execute the instructions from the memory during operation of the vehicle 10.

The controller 50 is generally programmed to regulate the injectors 40 for injecting fuel 18 into the cylinders 13 to enable operation of the engine 12. Specifically, the controller 50 is programmed to operate the injectors 40 during a particular first event, such as during a cold start, using an actuator command 52, for example, communicated via control signal, to establish a first operating parameter 54 representative of a first mode of component 40, i.e., injector, operation. The first operating parameter is a relatively small injection quantity, for example, in the range of 1-3 $mm^3$/stroke for a single injection per engine stroke in an individual cylinder. The first mode of operation is pilot fuel injection activated around 10 degrees before top dead center (BTDC) to warm up the combustion chamber 13A. In such an embodiment, the first mode of injector 40 operation may, for example, be defined by the small injection quantity in the range of 1-3 mm³/stroke (of the injector) for a single injection per engine stroke, as described above, and thus configured to support a cold start of the engine 12.

The controller 50 is also programmed to identify or diagnose a drift in the first operating parameter 54 negatively affecting, i.e., causing a fault in, the first mode of injector 40 operation. The controller 50 is additionally programmed to determine a command compensation 56 to the actuator command 52 to counteract the drift in the first operating parameter 54 during the first mode of injector 40 operation. The controller 50 is also programmed to determine a parameter compensation 58 to the first operating parameter 54 using the determined compensation 56 to the actuator command 52. Such determination of parameter compensation 58 may include translating the command compensation 56 into a delta reference compensation 60 value to apply directly to the first operating parameter 54.

The controller 50 is additionally programmed to apply the determined parameter compensation 58 directly to the first operating parameter 54. Specifically, the determined parameter compensation 58 is applied directly to the first operating parameter 54 to counteract the identified drift in the first operating parameter during the first mode of operation of the injector 40 without applying the determined command compensation 56 directly to the actuator command 52. Generally, drift in an operating parameter indicates loss of precision in the achievement of the subject parameter, i.e., straying of the parameter from its target value. In the case of drift in the first operating parameter during the first mode of operation of the injector 40 may indicate an incorrect amount of fuel 18 being injected into the cylinders 13. Injection of incorrect amount of fuel 18 into the cylinders 13 may be detrimental to the engine's combustion efficiency, and to operation of the AT devices 32, 34 in removing particulate byproducts and emission constituents of combustion from the exhaust gas 26.

The controller 50 is also programmed to operate the injector 40 using the actuator command 52 to establish a second operating parameter 62 representative of a second mode of injector 40 operation. The second operating parameter 62 may be a relatively large injection quantity, for example, in the range of 5-150 mm³/stroke, cumulative amount of fuel injected per engine cycle, multiple injections per stroke for multiple cylinders. The second mode of operation is main combustion fuel injection activated around 2-5 degrees BTDC (with the main injection in a typical diesel engine generally occurring across a full range of 20 degrees BTDC –5 degrees ATDC) to initiate full combustion in the combustion chamber 13A. In such an embodiment, the second mode of injector 40 operation may, for example, be defined by the large injection quantity in the range of 5-150 mm³/stroke, and configured to support operation of the engine 12 over a regular operating temperature range and generate engine torque in response to operator request. Other examples of main combustion fuel injection may include particular operating conditions such as engine 12 cranking and fueling during transient maneuvers.

Alternatively, the second operating parameter 62 may be a relatively small injection quantity, for example, in the range of 1-3 mm³/stroke for a single injection per engine stroke in an individual cylinder. In such an embodiment, the second mode of injector 40 operation may be post-combustion fuel injection activated around 100 milliseconds or 10-30 degrees after top dead center (ATDC). The post-combustion fuel injection may, for example, be defined by the small injection quantity in the range of 1-3 mm³/stroke, and configured to maintain effective operating temperature of the AT devices 32, 34 following main combustion in cylinders 13. As a result, identification of the drift in the second operating parameter 62 while applying the determined parameter compensation 58 directly to the first operating parameter 54 without applying the determined command compensation 56 to the actuator command 52 includes at least one of maintaining pre-combustion temperature in the combustion chambers 13A and maintaining combustion stability in the engine 12.

Furthermore, the controller 50 is programmed to identify or diagnose a drift in the second operating parameter 62 negatively affecting the second mode of injector 40 operation. Identification of the drift in the second operating parameter 62 is intended to take place while the determined parameter compensation is applied directly to the first operating parameter 54 and without applying the determined command compensation 56 to the actuator command 52. Accordingly, the controller 50 is configured to perform a non-intrusive diagnostic of the second operating parameter 62 drift during the second mode of operation, i.e., the compensated first operating parameter 54 and the first mode of operation are not affected during the second operating parameter 62 diagnostic. Such diagnostic further permits the controller to identify the health and capability of the component, e.g., injector, 40 to support the second mode of injector operation, without detrimentally affecting the injector's ability to support the first mode of operation.

The controller 50 may be additionally configured to determine and apply compensation to the second operating parameter 62 to counteract the identified drift during the second mode of operation without affecting the first mode of injector 40 operation. By identification of the drift in the second operating parameter 62 while applying the determined parameter compensation 58 directly to the first operating parameter 54 and without applying the determined command compensation 56 to the actuator command 52, the controller 50 is configured to maintain effective operation of the AT device(s) 32, 34 and maintain reduction of engine exhaust gas emissions thereby.

The determination of the parameter compensation 58 may include translating the command compensation 56 into a delta reference compensation value 64 to be applied directly to the first operating parameter 54. The delta reference compensation value 64 is intended to provide a specific incremental change directly to the first operating parameter 54, bypassing modification to the actuator command 52 to permit identification of drift in the second operating parameter 62. The controller 50 may be additionally configured to translate the command compensation 56 into the delta reference compensation value 64 via a mathematical relationship 66. The mathematical relationship 66 is intended to be programmed into the controller 50 and be used to calculate the delta reference compensation value 64 in response to the determined value of the command compensation 56. Alternatively, the controller 50 may be programmed to translate the determined value of command compensation 56 into the delta reference compensation value 64 via accessing an empirically derived data look-up table 68 of determined actuator command compensation 56 versus delta reference compensation values 64. In other words, the data look-up table 68 includes determined actuator command compensation 56 for operation of the injector 40 being cross-referenced or correlated with empirically derived delta reference compensation values 64.

The controller 50 may additionally be programmed to determine a pressure in the injector rail 42 and injection timing of the fuel injectors 40 used to operate the engine 12. The controller 50 may also be programmed to determine a number of injections or pulses of fuel 18 generated by each fuel injector 40 per engine cycle. Overall, the system 48 uses compensation learning strategy to perform a non-intrusive diagnostic of drift in the performance of engine component 40 during the second mode of operation, such that the compensated operating parameter 54 and the attendant first mode of operation are not affected.

Figure 3:
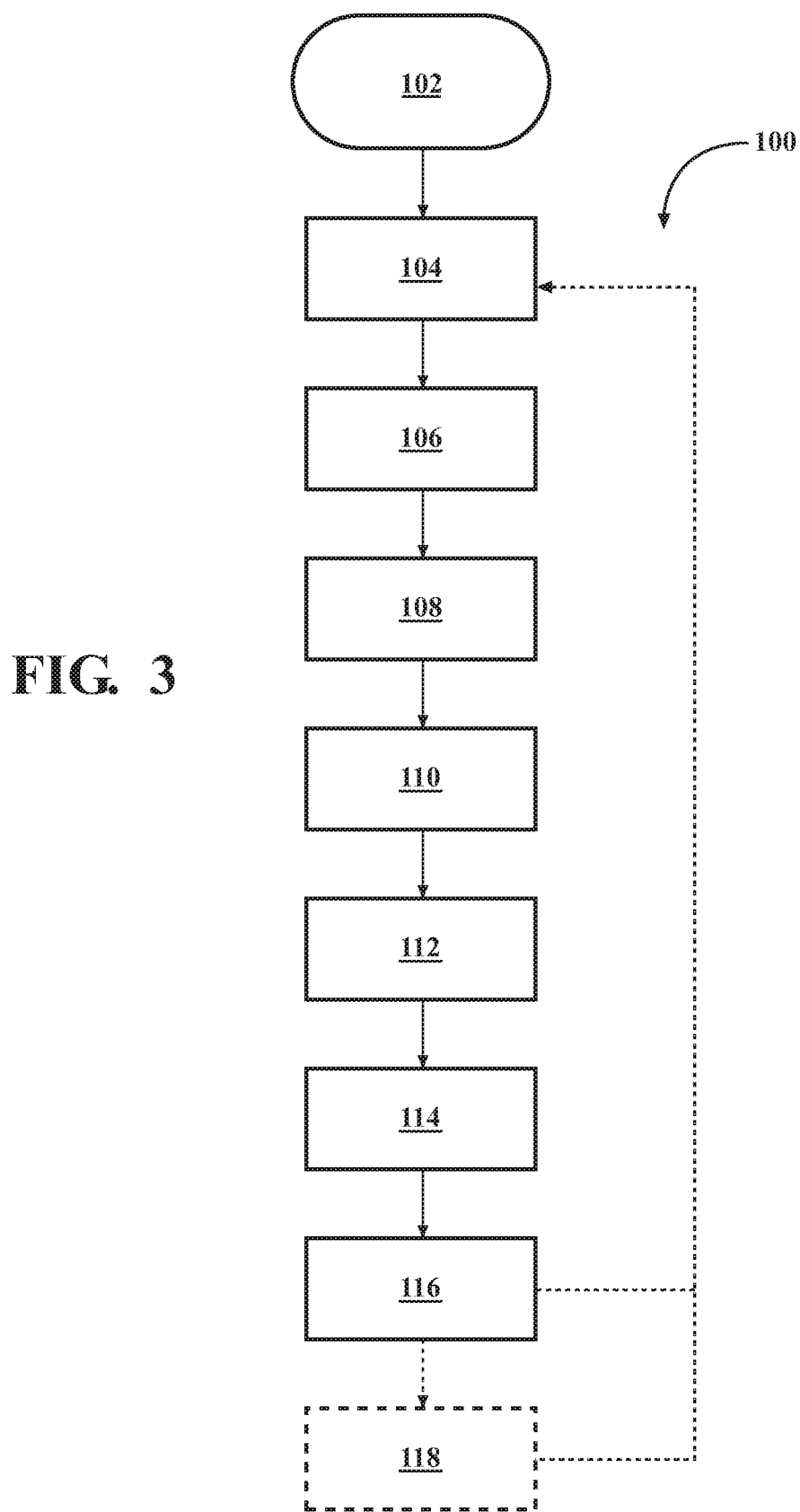
FIG. 3 is a flow diagram of a method using compensation learning strategy for a diagnostic of an internal combustion engine component shown in FIGS. 1 and 2.

FIG. 3 depicts a method 100 using compensation learning strategy for a diagnostic of the internal combustion engine component 40 using compensation learning strategy, as described above with respect to FIGS. 1 and 2. The method 100 may be performed via the electronic controller 50 programmed to regulate operation of the engine 12. The method 100 initiates in frame 102 with operating the engine 12 via the engine component, such as the fuel injector 40. Throughout the method, and starting with frame 102, the method generally includes supplying predetermined amounts of airflow 16 and fuel 18 to the engine 12. Following frame 102, the method proceeds to frame 104, where the method includes operating the engine component 40 using the actuator command 52 issued by the electronic controller 50 to establish the first operating parameter 54 representative of the first mode of component operation.

After frame 104, the method advances to frame 106. In frame 106, the method includes identifying, via the electronic controller 50, drift in the first operating parameter 54 negatively affecting the first mode of operation. Following frame 106 the method proceeds to frame 108, where the method includes determining, via the electronic controller 50, the command compensation 58 to the actuator command 52 to counteract the drift in the first operating parameter 54 during the first mode of operation. After frame 108, the method advances to frame 110. In frame 110 the method includes determining, via the electronic controller 50, the parameter compensation 58 to the first operating parameter 54 using the determined compensation 58 to the actuator command 52.

Determining the parameter compensation 58 in frame 110 may include translating the command compensation into the delta reference compensation value 64 to apply directly to the first operating parameter 54 while identifying the drift in the second operating parameter 62. Translating the determined parameter compensation 58 into the delta reference compensation value 64 may include using the mathematical relationship 66 programmed into the controller 50, as discussed above with respect to FIGS. 1 and 2. Alternatively, translating the determined parameter compensation 58 into the delta reference compensation value 64 may include accessing the look-up table 68 of values of determined parameter compensation 58 to the actuator command 52 versus delta reference compensation values.

Following frame 110, the method moves on to frame 112. In frame 112 the method includes applying the determined parameter compensation 58 directly to the first operating parameter 54 to counteract the drift in the first operating parameter 54 during the first mode of operation without applying the determined command compensation 58 to the actuator command 52. After frame 112, the method may advance to frame 114. In frame 114 the method may include operating the engine component 40 using the actuator command 52 to establish the second operating parameter 62 representative of the second mode of component 40 operation.

Following frame 114, the method moves on to frame 116. In frame 116 the method includes identifying, via the electronic controller 50, the drift in the second operating parameter 62 negatively affecting the second mode of operation. The subject identification of the drift in the second operating parameter 62 takes place while the controller 50 applies the determined parameter compensation 58 directly to the first operating parameter 54 and without applying the determined command compensation 56 to the actuator command 52. Following frame 116, the method may advance to frame 118, where the method includes determining and applying, via the electronic controller 50, compensation to the second operating parameter 62 of the component 40 to counteract the component's drift during the second mode of operation. Following either frame 116 or 118 the method may loop back to frame 104 for continued operation of the engine component 40 using the actuator command 52 to establish the first operating parameter 54 representative of the first mode of component operation.

Accordingly, the controller 50 may be programmed to continuously monitor operation of the engine 12, the engine component, e.g., injector, 40, and the AT system 30 and perform, as part of the method 100, a non-intrusive diagnostic of drift in the performance of the subject component 40 during the second mode of operation. The method 100 being specifically configured to perform the diagnostic such that the compensated operating parameter 54 and the attendant first mode of operation are not affected. In other words, the method 100 is configured to reduce an influence of the learning compensation one component 40 operating parameter on the diagnostic observation of another component 40 operating parameter, without detrimentally impacting performance of the subject component in achieving a target of the first mode of operation.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method using compensation learning strategy for a diagnostic of an internal combustion engine component, the method comprising:

operating the engine component using an actuator command issued by an electronic controller to establish a first operating parameter representative of a first mode of component operation;

identifying, via the electronic controller, a drift in the first operating parameter negatively affecting the first mode of operation;

determining, via the electronic controller, a command compensation to the actuator command to counteract the drift in the first operating parameter during the first mode of operation;

determining, via the electronic controller, a parameter compensation to the first operating parameter using the determined compensation to the actuator command;

applying the determined parameter compensation directly to the first operating parameter;

operating the engine component using the actuator command to establish a second operating parameter representative of a second mode of component operation; and identifying, via the electronic controller, a drift in the second operating parameter negatively affecting the second mode of operation while applying the determined parameter compensation directly to the first operating parameter and without applying the determined command compensation to the actuator command.

2. The method of claim 1, wherein the determining the parameter compensation includes translating the command compensation into a delta reference compensation value to apply directly to the first operating parameter while identifying the drift in the second operating parameter.

3. The method of claim 2, wherein the translating determined parameter compensation into the delta reference compensation value includes using a mathematical relationship programmed into the controller.

4. The method of claim 2, wherein the translating the determined parameter compensation into the delta reference compensation value includes accessing a look-up table of values of determined parameter compensation to the actuator command versus delta reference compensation values.

5. The method of claim 1, wherein the engine is a compression ignition engine and the component is an injector configured to inject fuel into the engine.

6. The method of claim 5, wherein the first operating parameter is a relatively small injection quantity and the first mode of operation is pilot fuel injection.

7. The method of claim 6, wherein the second operating parameter is a relatively large injection quantity and the second mode of operation is main combustion fuel injection.

8. The method of claim 7, wherein the identifying the drift in the second operating parameter while applying the determined parameter compensation directly to the first operating parameter and without applying the determined command compensation to the actuator command includes at least one of maintaining pre-combustion temperature in the combustion chamber and maintaining combustion stability in the engine.

9. The method of claim 6, wherein the second operating parameter is a relatively small injection quantity and the second mode of operation is post-combustion fuel injection.

10. The method of claim 9, wherein the engine includes an exhaust after-treatment (AT) device configured to reduce engine exhaust gas emissions, and wherein the identifying the drift in the second operating parameter while applying the determined parameter compensation directly to the first operating parameter and without applying the determined command compensation to the actuator command includes maintaining effective operation of the AT device and maintaining reduction of engine exhaust gas emissions thereby.

11. A system using compensation learning strategy for a diagnostic of an internal combustion engine component, the system comprising:

an engine component configured to operate the engine; and an electronic controller programmed to:
operate the engine component using an actuator command to establish a first operating parameter representative of a first mode of component operation;

identify a drift in the first operating parameter negatively affecting the first mode of operation;

determine a command compensation to the actuator command to counteract the drift in the first operating parameter during the first mode of operation;

determine a parameter compensation to the first operating parameter using the determined compensation to the actuator command;

apply the determined parameter compensation directly to the first operating parameter;

operate the engine component using the actuator command to establish a second operating parameter representative of a second mode of component operation; and identify a drift in the second operating parameter negatively affecting the second mode of operation while applying the determined parameter compensation directly to the first operating parameter and without applying the determined command compensation to the actuator command.

12. The system of claim 11, wherein the determination of the parameter compensation includes translation of the command compensation into a delta reference compensation value, and the delta reference compensation value is applied directly to the first operating parameter while the drift in the second operating parameter is identified.

13. The system of claim 12, wherein the controller is programmed to translate the command compensation into the delta reference compensation value via a mathematical relationship.

14. The system of claim 12, wherein the controller is programmed to translate the command compensation into the delta reference compensation value via accessing a look-up table of values of determined compensation to the actuator command versus delta reference compensation values.

15. The system of claim 11, wherein the engine is a compression ignition engine and the component is an injector configured to inject fuel into the engine.

16. The system of claim 15, wherein the first operating parameter is a relatively small injection quantity and the first mode of operation is pilot fuel injection.

17. The system of claim 16, wherein the second operating parameter is a relatively large injection quantity and the second mode of operation is main combustion fuel injection.

18. The system of claim 17, wherein the identification of the drift in the second operating parameter while applying the determined parameter compensation directly to the first operating parameter and without applying the determined command compensation to the actuator command includes at least one of maintaining pre-combustion temperature in the combustion chamber and maintaining combustion stability in the engine.

19. The system of claim 16, wherein the second operating parameter is a relatively small injection quantity and the second mode of operation is post-combustion fuel injection.

20. The system of claim 19, wherein the engine includes an exhaust after-treatment (AT) device configured to reduce engine exhaust gas emissions, and wherein via the identification of the drift in the second operating parameter while applying the determined parameter compensation directly to the first operating parameter and without applying the determined command compensation to the actuator command, the controller is configured to maintain effective operation of the AT device and maintain reduction of engine exhaust gas emissions thereby.

* * * * *